United States Patent
Tang

(10) Patent No.: US 11,287,822 B2
(45) Date of Patent: Mar. 29, 2022

(54) SELF-MOVING ROBOT, CONTROL METHOD THEREOF AND COMBINED ROBOT COMPRISING SELF-MOVING ROBOT

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

(*) Notice: Subject to any disclaimer, the term of this patent is extended or adjusted under 35 U.S.C. 154(b) by 335 days.

(21) Appl. No.: 16/303,096

(22) PCT Filed: May 19, 2017

(86) PCT No.: PCT/CN2017/085023
§ 371 (c)(1),
(2) Date: Nov. 19, 2018

(87) PCT Pub. No.: WO2017/198208
PCT Pub. Date: Nov. 23, 2017

(65) Prior Publication Data
US 2019/0302778 A1 Oct. 3, 2019

(30) Foreign Application Priority Data
May 19, 2016 (CN) .......................... 201610338329.8

(51) Int. Cl.
*G05D 1/00* (2006.01)
*G05D 1/02* (2020.01)
(Continued)

(52) U.S. Cl.
CPC ............ *G05D 1/0212* (2013.01); *A47L 11/24* (2013.01); *A47L 11/4061* (2013.01); *B25J 9/08* (2013.01);
(Continued)

(58) Field of Classification Search
CPC ......... G05D 1/0212; G05D 2201/0203; G05D 1/021; B25J 9/08; B25J 9/0003; A47L 11/24; A47L 11/4061; A47L 2201/04
See application file for complete search history.

(56) References Cited

U.S. PATENT DOCUMENTS

2007/0050937 A1   3/2007   Song et al.
2009/0306822 A1   12/2009  Augenbraun et al.
2016/0088755 A1*  3/2016   Lee ........................ B25J 13/006
                                                        361/731

FOREIGN PATENT DOCUMENTS

CN      1927553 A     3/2007
CN    101297627 B    11/2008
(Continued)

OTHER PUBLICATIONS

CN 204839367 in view of English Translation (Year: 2015).*
(Continued)

*Primary Examiner* — Ian Jen
(74) *Attorney, Agent, or Firm* — Maschoff Brennan

(57) ABSTRACT

The self-moving robot may be abutted with functional modules and may include a functional module recognition mechanism and a control mechanism. The control mechanism regulates an operating parameter or an operating mode of the self-moving robot according to the type of the functional module recognized by the recognition mechanism. Due to the utilization of the self-moving robot and the control method thereof provided by the present disclosure, parameters of the sensor and the self-walking speed and the like of the self-moving robot may be regulated according to actual situations under the condition that different modules are combined together to work, so that toppling or falling of the self-moving robot is reduced, and the safety of personnel and the robot itself may be improved.

15 Claims, 2 Drawing Sheets

(51) Int. Cl.
  *A47L 11/24* (2006.01)
  *A47L 11/40* (2006.01)
  *B25J 9/08* (2006.01)
  *B25J 9/00* (2006.01)

(52) U.S. Cl.
  CPC .......... *A47L 2201/04* (2013.01); *B25J 9/0003* (2013.01); *G05D 2201/0203* (2013.01)

(56) References Cited

FOREIGN PATENT DOCUMENTS

| | | |
|---|---|---|
| CN | 101297267 B | 1/2012 |
| CN | 102736622 A | 10/2012 |
| CN | 204839367 U | 12/2015 |
| CN | 105433878 A | 3/2016 |
| CN | 105501321 A | 4/2016 |
| EP | 1759965 A1 | 3/2007 |
| EP | 3000369 A1 | 3/2016 |
| WO | 2005006935 A1 | 1/2005 |
| WO | 2014/015788 A1 | 1/2014 |

OTHER PUBLICATIONS

CN Office Action in Application No. 201610338329.8 dated Apr. 4, 2018.
European Search Report in Application No. 17798771.6 dated Dec. 10, 2019.
CN Office Action in Application No. 201610338329.8 dated Nov. 15, 2018.

* cited by examiner

SELF-MOVING ROBOT, CONTROL METHOD THEREOF AND COMBINED ROBOT COMPRISING SELF-MOVING ROBOT

FIELD

The present disclosure relates to a self-moving robot, a control method thereof and a combined robot comprising the self-moving robot.

BACKGROUND

In recent years, household self-moving robots have been gradually recognized by users and widely applied to the market by virtue of the advantages of freely walking and autonomously cleaning floors or glass and the like. For some self-moving robots, the home environments of the users are diverse, the house type, area and the like are different, and even, complex situations such as staircases or sunk living rooms exist in houses of many users. To reduce product damage caused by falling due to steps or collision with an obstacle such as a wall in a walking process, the self-moving robot is generally provided with a downward-looking sensor with fixed parameters, so that the self-moving robot may detect front situations while walking and report the front situations to a central processing unit, and the central processing unit gives a route changing instruction in time.

However, the downward-looking sensor may guarantee the safety of the self-moving robot in certain situations, for example, when the self-weight of the self-moving robot is relatively light and is kept constant. However, it is possible that the self-moving robot may run into a person or an obstacle ahead of the self-moving robot and therefore fall to the bottom of the steps due to inertia increment under the condition that the self-weight of the self-moving robot is increased. In these or other situations, the personal safety of family members may be threatened, and it is possible that economic loss may result due to personnel injury or self-moving robot damage.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Description of Example Embodiments. This Summary is not intended to identify key features or essential characteristics of the claimed subject matter, nor is it intended to be used as an aid in determining the scope of the claimed subject matter.

The present disclosure is proposed for solving problems of conventional methods, including the example problems mentioned in the Background section. Additionally, the present disclosure aims at providing a self-moving robot and a control method thereof so that the self-moving robot may safely walk under or according to different combination modes.

In the present disclosure, a control method of a self-moving robot is provided according to one embodiment of the present disclosure, wherein the self-moving robot may be combined with functional modules. In these or other embodiments, the self-moving robot comprises a control mechanism and a functional module recognition mechanism, and the method comprises regulating an operating parameter or an operating mode of the self-moving robot by the control mechanism according to the type of the recognized currently-combined functional module.

Additionally or alternatively, the present disclosure provides a self-moving robot, wherein the self-moving robot may be abutted with functional modules. In these or other embodiments, the self-moving robot comprises the functional module recognition mechanism and the control mechanism, and the control mechanism regulates the operating parameter or the operating mode of the self-moving robot according to the type of the functional module recognized by the recognition mechanism.

Additionally or alternatively, the present disclosure provides a combined robot, wherein the combined robot comprises the self-moving robot and the functional modules abutted with the self-moving robot. In these or other embodiments, the self-moving robot comprises the functional module recognition mechanism and the control mechanism, and the control mechanism regulates the operating parameter or the operating mode of the self-moving robot according to the type of the functional module recognized by the recognition mechanism.

Thus, in some embodiments, due to the utilization of the self-moving robot and the control method thereof provided by the present disclosure, parameters of the sensor and the self-walking speed and the like of the self-moving robot may be regulated according to actual situations under the condition that the different modules are combined together to work, so that the toppling or falling of the self-moving robot is reduced and/or prevented, and the safety of personnel and the robot itself may be improved.

BRIEF DESCRIPTION OF THE DRAWINGS

The technical scheme of the present disclosure is described in detail below in combination with the accompanying drawings and specific embodiments.

DESCRIPTION OF EXAMPLE EMBODIMENTS

The technical scheme of some of the embodiments of the present disclosure is clearly and completely described below in combination with the accompanying drawings, and it is apparent that the described embodiments are only a part of embodiments of the present disclosure, but are not all of the embodiments. Based on the embodiments in the present disclosure, other similar embodiments fall within the scope of the present disclosure.

The present disclosure includes a self-moving robot, wherein the self-moving robot may be combined with functional modules, and the self-moving robot comprises a control mechanism and a functional module recognition mechanism. The control mechanism regulates an operating parameter or an operating mode of the self-moving robot according to the type of the functional module recognized by the recognition mechanism.

Figure 1:
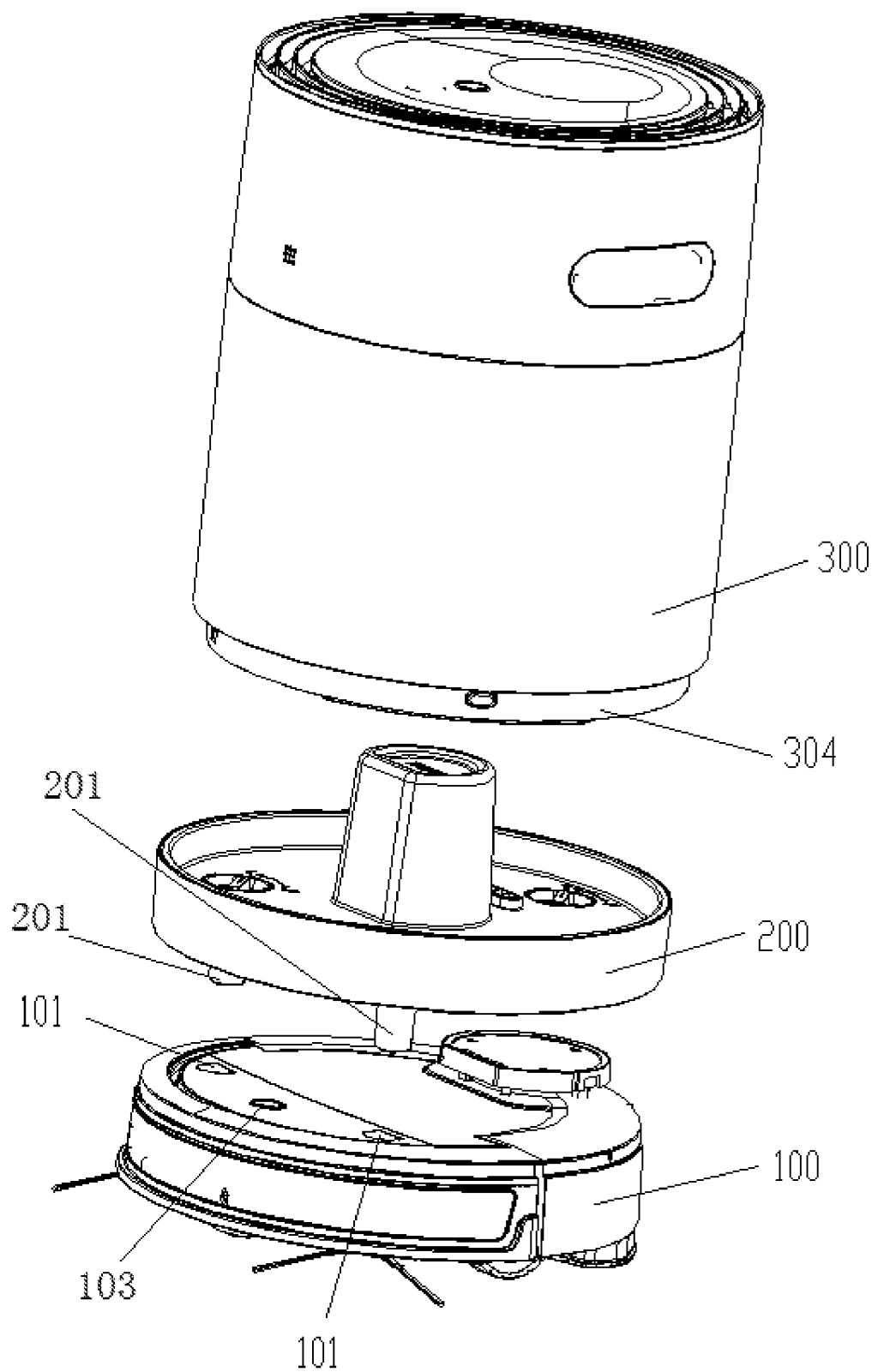
FIG. 1 is an exemplary module diagram of a self-moving robot of the present disclosure.

FIG. 1 is an exemplary module diagram of the self-moving robot of the present disclosure. Specifically, one implementation way of the self-moving robot and the functional modules provided by the present disclosure may be that other functional modules are vertically and upwardly stacked in sequence by taking a sweeping robot module as shown in FIG. 1 as a base. FIG. 1 shows that the self-moving robot 100 and functional module 300 are connected together by a connecting piece 200. The self-moving robot 100 is provided with a control mechanism (not shown in the figure), and the control mechanism controls a combined robot to work according to a combination state. As shown in FIG. 1, a groove is formed in the self-moving robot, and the connecting piece 200 is provided with a locating column 201. The abutment between the self-moving robot and a functional module is kept accurate in a way that the groove 101 aligns to the locating column 201 on the connecting piece. Additionally or alternatively, the inner surface of the circular outer wall of the connecting piece 200 is matched with an outer wall 304 at the bottom of the functional module 300. The self-moving robot is a robot which has functions and is completely capable of independently working. For example, as shown in FIG. 1, the self-moving robot 100 is a cleaning robot, so that the control mechanism may be used for controlling the walking and cleaning functions of the cleaning robot, and the control and work ways of the cleaning robot are similar to other applications.

In these or other embodiments, a way of upwardly combining and stacking the modules is only exemplarily shown as above. The combination way of the modules of the self-moving robot provided by the present disclosure may also be that the modules are mutually spliced together in a horizontal direction and comprises a combination way that the modules are spliced left and right to work together. In addition, it may also be that a space for mounting and updating other modules and an interface are reserved on the cleaning robot/the self-moving robot, so that it is convenient for users to make choices as required, and it is convenient for manufacturers to realize production according to orders.

Referring to FIG. 1, in one example embodiment, the upper surface of the self-moving robot 100 is provided with an electric abutting part 103, and a functional module is provided with an adapting part (not shown in the figure) matched with the electric abutting part 103. When the functional module is assembled on the self-moving robot 100, the electric abutting part 103 is electrically connected with the adapting part, and the recognition mechanism receives equipment information of the functional module by virtue of the electric abutting part 103 and the adapting part.

In other embodiments, detecting the current combination by the self-moving robot (step S1 in FIG. 2) means that the current combination state of the modules of the self-moving robot is detected by the recognition mechanism. A signal which has been connected with a certain module may be sent to the recognition mechanism in a way of arranging a Hall switch or a microswitch and the like triggered during connection among the modules.

In these or other embodiments, the self-moving robot may be capable of independently working as the cleaning robot, and, in addition, the functional modules may alternatively include one or more of a security module, an air purification module, a humidification module, a dehumidification module and a home entertainment module.

Figure 4:
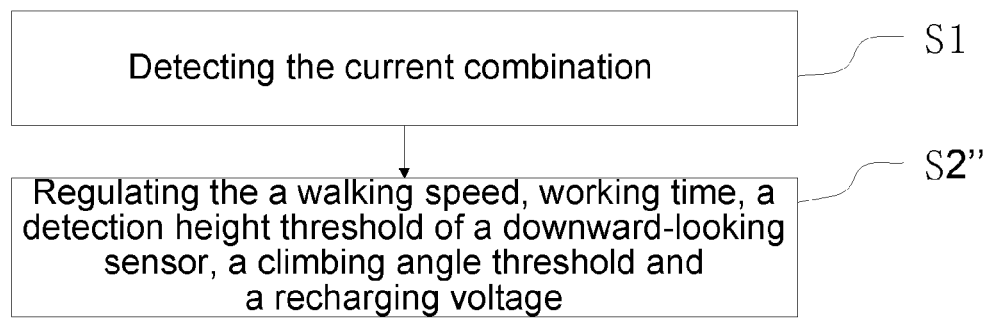
FIG. 4 is still another example flow diagram of a control method of the self-moving robot of the present disclosure.

In these or other embodiments, a control method of the self-moving robot is included, and the method comprises: regulating an operating parameter or an operating mode of the self-moving robot by the control mechanism according to the type of the recognized currently-combined functional module. For example, as illustrated in block S2" of FIG. 4, the operating parameter, which may be regulated according to the type of the currently-combined functional module, of the self-moving robot, comprises one or more of the walking speed of the combination state, the working time, a detection height threshold of a downward-looking sensor, a climbing angle threshold and a recharging voltage.

Additionally or alternatively, a specific way of regulating the operating parameter of the self-moving robot according to the type of the currently-combined functional module is at least selected from two ways. One way is that at least one of operating parameter setting schemes may be selected according to any one or any combination of the mass, volume, operating power and operating mode of a functional module standard part for combination, and then, a corresponding operating parameter setting scheme is selected according to the type of the recognized functional module. Another way is any one or any combination of that the mass, volume, operating power and required operating mode of the currently-combined functional module may be directly recognized by the recognition mechanism, and then, the operating parameter to be regulated for operating in the combination state is calculated.

The relationship between the self-parameters of the functional modules, including the functional module standard part and the operating parameter to be regulated is approximately shown as follows: the mass of the functional modules, including the functional module standard part that forms a negative correlation to the detection height threshold of the downward-looking sensor; the volume of the functional modules, including the functional module standard part that forms a negative correlation to the walking speed and the climbing angle threshold; and the operating power of the functional modules, including the functional module standard part that forms a negative correlation to the working time and forms positive correlation to the recharging voltage. In these or other embodiments, a negative correlation may include an inverse relationship or other suitable relationship.

Figure 2:
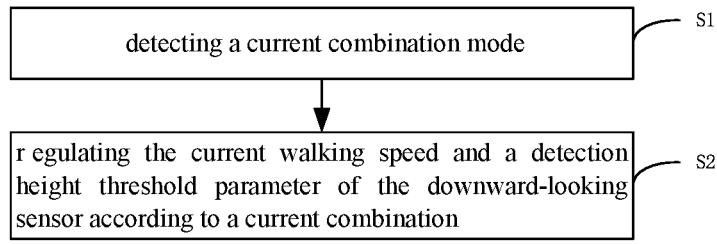
FIG. 2 is an exemplary flow diagram of a control method of the self-moving robot of the present disclosure.

In one specific embodiment as shown in FIG. 2, the control method of the self-moving robot comprises:

S1. detecting a current combination mode, wherein the current combination mode may be simply interpreted as a combination mode corresponding to the type of at least one functional module connected to the self-moving robot. For example, the detected current combination mode may be a purification combination mode corresponding to a purification type if the type of the purification module connected to the self-moving robot is the purification type. Additionally or alternatively, the detected current combination mode may be a humidification combination mode corresponding to a humidification type if the type of the humidification module connected to the self-moving robot is the humidification type. Additionally or alternatively, the detected current combination mode may be a humidification and security combination mode corresponding to a combination type composed of a humidification type and a security type if the self-moving robot is connected with the humidification module and the security module; and S2. regulating the current walking speed and a detection height threshold parameter of the downward-looking sensor according to a current combination, for example, by automatically regulating the walking speed of the self-moving robot and the detection height threshold parameter of the downward-looking sensor according to the detected current combination mode. In other words, once it is detected that other functional modules such as the purification module or the humidification module are also connected in addition to the sweeping robot, the current walking speed may be actively regulated to be low, so that the self-moving robot may walk in a stable manner under the condition that the total weight of the self-moving robot is increased.

The parameters of the downward-looking sensor may also be regulated while the current walking speed is regulated. For example, the whole height of the self-moving robot may be increased under the condition of the combination state and particularly the vertical stacking combination way, so that the center of gravity becomes higher. In such a way, concave pits and the like which may be passed under a normal condition become obstacles which may not be passed, and the self-moving robot may topple if forcibly passing through the concave pits and the like. The parameters of the downward-looking sensor may be regulated to make the downward-looking sensor become more sensitive, so that it may be ensured that the self-moving robot may walk by steering to avoid inclined slopes, the concave pits and the like which may be passed in other states or conditions, but may not be passed in the combination state.

Meanwhile, the self-moving robot provided by the present disclosure may also determine different recharging voltages according to different combination modes. For example, the recharging voltage is correspondingly increased when the relatively heavy humidification module containing a water tank is carried, and thus, it may be ensured that the self-moving robot has sufficient power to walk to the position of a charger. In this manner, the defect of the self-moving robot becoming incapable of walking due to midway power insufficiency is reduced.

Figure 3:
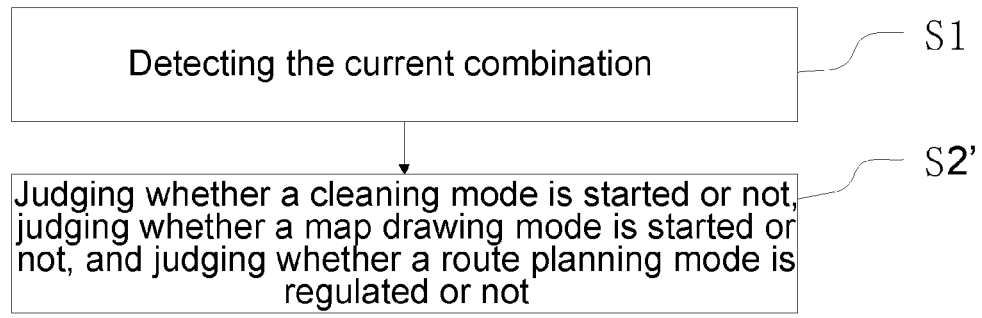
FIG. 3 is another example flow diagram of a control method of the self-moving robot of the present disclosure.

In addition as illustrated in block S2' of FIG. 3, regulating the operating mode of the self-moving robot according to the type of the currently-combined functional module may also include: judging whether a cleaning mode is started or not, judging whether a map drawing mode is started or not, and judging whether a route planning mode is regulated or not.

Due to the utilization of the self-moving robot and the control method thereof provided by some embodiments, the parameters of the sensor and the self-walking speed of the self-moving robot may be regulated according to actual situations under the condition that the different modules are combined together to work, so that the toppling or falling of the self-moving robot is reduced, and the safety of personnel and the robot itself may be improved.

Other embodiments not expressly discussed in the present disclosure may nevertheless fall within the spirit and scope of the present disclosure.

Thus, in some embodiments, aspects of the present disclosure may include:

(1) a control method of a self-moving robot, wherein the self-moving robot may be combined with functional modules, the self-moving robot comprising a control mechanism and a functional module recognition mechanism, and the method comprising: regulating an operating parameter or an operating mode of the self-moving robot by the control mechanism according to the type of the recognized currently-combined functional module.

(2) For the control method of the self-moving robot according to (1), the operating parameter, which may be regulated according to the type of the currently-combined functional module, of the self-moving robot, comprises one or more of walking speed, working time, a detection height threshold of a downward-looking sensor, a climbing angle threshold and a recharging voltage, etc.

(3) For the control method of the self-moving robot according to (2), regulating the operating parameter of the self-moving robot according to the type of the currently-combined functional module may comprise: presetting a plurality of operating parameter setting schemes according to the mass, volume, operating power and operating mode of a functional module standard part for combination; and selecting a corresponding operating parameter setting scheme according to the type of the recognized functional module.

(4) For the control method of the self-moving robot according to (2), regulating the operating parameter of the self-moving robot according to the type of the currently-combined functional module may comprise: recognizing the mass, volume, operating power and required operating mode of the currently-combined functional module by the recognition mechanism, and calculating the operating parameter to be regulated for operating in the combination state.

(5) For the control method of the self-moving robot according to (2), the self-moving robot may be a cleaning robot, and the operating mode, which may be regulated according to the type of the currently-combined functional module, of the cleaning robot, comprises a cleaning mode, a map drawing mode and a route planning mode.

(6) The present disclosure provides a self-moving robot, wherein the self-moving robot may be abutted with functional modules. In these or other embodiments, the self-moving robot comprises a functional module recognition mechanism and a control mechanism. Additionally or alternatively, the control mechanism regulates the operating parameter or the operating mode of the self-moving robot according to the type of the functional module recognized by the recognition mechanism.

(7) For the self-moving robot according to (1), the upper surface of the self-moving robot is provided with an electric abutting part, and functional modules are provided with an adapting part matched with the electric abutting part. When the functional module is assembled on the self-moving robot, the electric abutting part is electrically connected with the adapting part, and the recognition mechanism receives equipment information of the functional module by virtue of the electric abutting part and the adapting part.

(8) For the self-moving robot according to (6), the functional modules include one or more of a security module, an air purification module, a humidification module, a dehumidification module and a home entertainment module.

(9) For the control method of the self-moving robot according to (8), the functional modules are stacked and combined on a self-moving robot module.

(10) The present disclosure includes a combined robot, in which the combined robot comprises the self-moving robot and the functional modules abutted with the self-moving robot.

Additionally or alternatively, the self-moving robot comprises the functional module recognition mechanism and the control mechanism, and the control mechanism regulates the operating parameter or the operating mode of the self-moving robot according to the type of the functional module recognized by the recognition mechanism.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A control method of a self-moving robot to be combined with functional modules, the self-moving robot including a control mechanism and a functional module recognition mechanism, the control method comprising:
    regulating an operating parameter of the self-moving robot by the control mechanism according to a type of a recognized currently-combined functional module.

2. The control method of the self-moving robot according to claim 1, wherein the operating parameter comprises any one or any combination of a walking speed, a working time, a detection height threshold of a downward-looking sensor, a climbing angle threshold, and a recharging voltage.

3. The control method of the self-moving robot according to claim 2, wherein regulating the operating parameter of the self-moving robot comprises:
    presetting a plurality of operating parameter setting schemes according to any one or any combination of mass, volume, operating power and an operating mode of a functional module standard part for combination; and
    selecting a corresponding operating parameter setting scheme according to the type of the recognized functional module.

4. The control method of the self-moving robot according to claim 2, wherein regulating the operating parameter of the self-moving robot according to the type of the currently-combined functional module comprises:
    recognizing any one or any combination of mass, volume, operating power and an operating mode of the currently-combined functional module by the recognition mechanism; and
    calculating the operating parameter to be regulated for operating in a combination state.

5. The control method of the self-moving robot according to claim 2, further comprising regulating an operating mode of the self-moving robot by the control mechanism according to the type of the recognized currently-combined functional module; wherein the self-moving robot is a cleaning robot, and the operating mode comprises any one or any combination of a cleaning mode, a map drawing mode and a route planning mode.

6. A self-moving robot, configured to be combined with functional modules, the self-moving robot comprising:
    a functional module recognition mechanism; and
    a control mechanism that regulates an operating parameter of the self-moving robot according to a type of the functional module recognized by the recognition mechanism.

7. The self-moving robot according to claim 6, wherein:
    an upper surface of the self-moving robot is provided with an electric abutting part;
    functional modules are provided with a second electric coupling part matched with a first electric coupling part,
    when the functional module is assembled on the self-moving robot, the first electric coupling part is electrically connected with the second electric coupling part; and the recognition mechanism receives equipment information of the functional module by virtue of the first electric coupling part and the second electric coupling part.

8. The self-moving robot according to claim 6, wherein the functional modules comprise one or more of a security module, an air purification module, a humidification module, a dehumidification module and a home entertainment module.

9. The self-moving robot according to claim 8, wherein the functional modules are stacked and combined on the self-moving robot.

10. A combined robot comprising:
a self-moving robot and functional modules abutted with the self-moving robot, the self-moving robot comprising a functional module recognition mechanism and a control mechanism, and the control mechanism regulating an operating parameter of the self-moving robot according to a type of the functional module recognized by the recognition mechanism.

11. The control method of the self-moving robot according to claim 1, further comprising regulating an operating mode of the self-moving robot according to the type of the functional module recognized by the recognition mechanism, wherein the operating mode comprises any one or any combination of a cleaning mode, a map drawing mode and a route planning mode.

12. The self-moving robot according to claim 6, wherein the operating parameter comprises any one or any combination of a walking speed, a working time, a detection height threshold of a downward-looking sensor, a climbing angle threshold, and a recharging voltage.

13. The self-moving robot according to claim 6, wherein the control mechanism further regulates an operating mode of the self-moving robot according to the type of the functional module recognized by the recognition mechanism, and the operating mode comprises any one or any combination of a cleaning mode, a map drawing mode and a route planning mode.

14. The combined robot according to claim 10, wherein the operating parameter comprises any one or any combination of a walking speed, a working time, a detection height threshold of a downward-looking sensor, a climbing angle threshold, and a recharging voltage.

15. The combined robot according to claim 10, wherein the control mechanism further regulates an operating mode of the self-moving robot according to the type of the functional module recognized by the recognition mechanism, and the operating mode comprises any one or any combination of a cleaning mode, a map drawing mode and a route planning mode.

* * * * *